United States Patent [19]

Sommer

[11] Patent Number: 4,856,630

[45] Date of Patent: Aug. 15, 1989

[54] MOTOR VEHICLE

[75] Inventor: Hans D. Sommer, Graz, Austria

[73] Assignee: Steyr-Daimler-Puch AG, Vienna, Austria

[21] Appl. No.: 192,324

[22] Filed: Apr. 27, 1988

[30] Foreign Application Priority Data

Apr. 29, 1987 [AT] Austria .................. 1067/87

[51] Int. Cl.$^4$ .................. B60K 41/24; F16D 67/02
[52] U.S. Cl. .................. 192/13 R; 192/103 R; 192/104 R; 180/233
[58] Field of Search ............... 192/13 R, 85 V, 103 F, 192/103 R, 104 F, 104 R; 180/233

[56] References Cited

U.S. PATENT DOCUMENTS

| 4,556,134 | 12/1985 | Takano | 180/233 |
| 4,714,127 | 12/1987 | Fanti et al. | 180/233 |
| 4,732,248 | 3/1988 | Yoshimura et al. | 192/13 R |

FOREIGN PATENT DOCUMENTS

| 0212721 | 3/1987 | European Pat. Off. | 180/233 |
| 3427725 | 8/1985 | Fed. Rep. of Germany . | |
| 3505455 | 8/1986 | Fed. Rep. of Germany . | |
| 2132303 | 7/1984 | United Kingdom | 180/233 |

Primary Examiner—Dwight G. Diehl
Assistant Examiner—Andrea Pitts
Attorney, Agent, or Firm—Marmorek, Guttman & Rubenstein

[57] ABSTRACT

A motor vehicle comprises a primary driven axle and a secondary driven axle which is adapted to be arbitrarily driven under the control of an electric control device. In order to ensure a more reliable handling of the vehicle during a braking, the electric control device comprises a switch, which is arranged to be automatically enabled in response to a rise of the speed of travel of the vehicle to a predetermined value and which in an enabled state is arranged to respond to a braking operation or a predetermined braking operation by a disabling of the drive train leading to the secondary driven axle and to maintain the drive train disabled, and an additional switch, which is manually operable to enable the drive train.

13 Claims, 1 Drawing Sheet

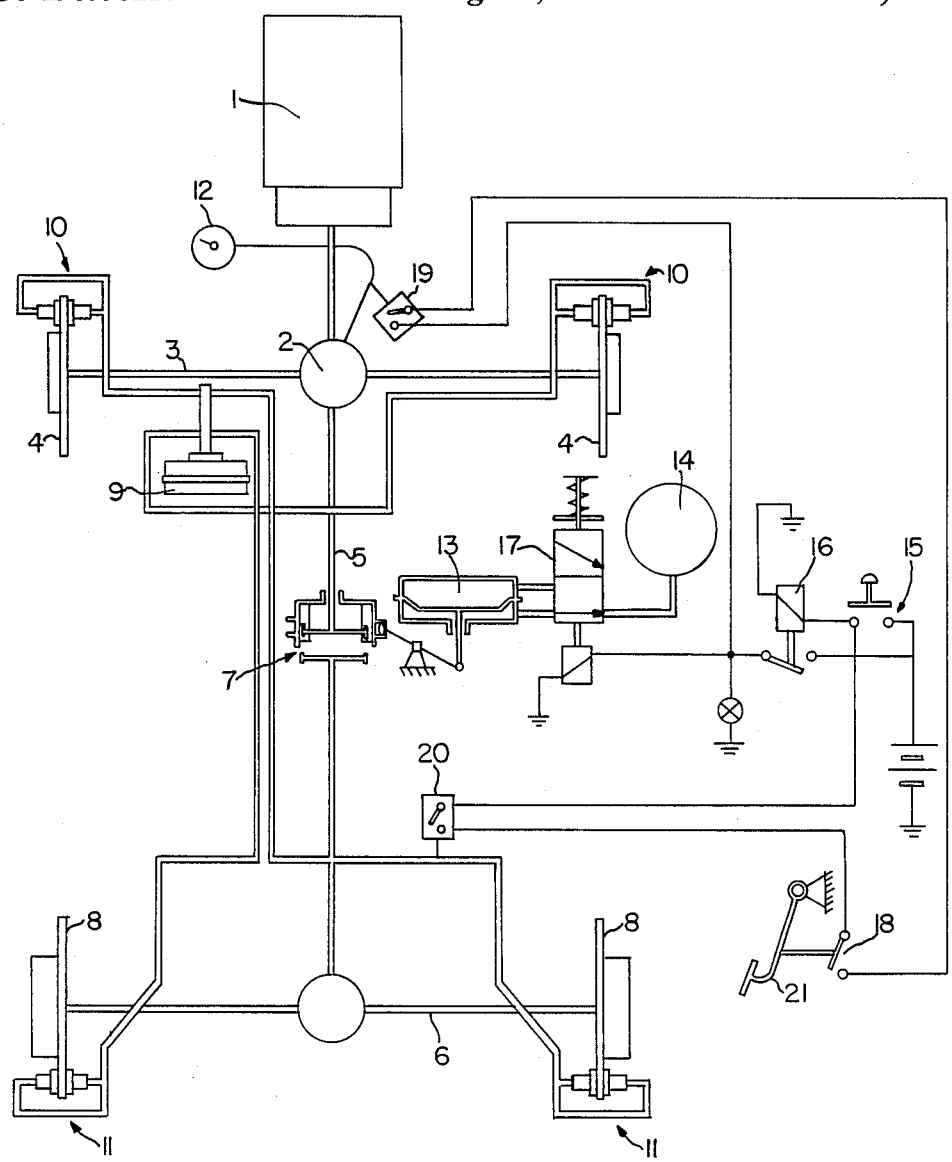

MOTOR VEHICLE

BACKGROUND OF THE INVENTION

1. Field of the Invention

This invention relates to a motor vehicle comprising a primary driven axle and a secondary driven axle which is adapted to be arbitrarily driven under the control of an electric control device.

2. Description of the Prior Art

Numerous motor vehicles of that kind are known and permit the secondary driven axle to be enabled under the control of means which involve a relatively low structural expenditure. But a disadvantage of those known motor vehicles resides in that a braking during an all-wheel drive operation may result in an unstable handling of the vehicle particlarly when the wheels disposed on both sides of the vehicle are rolling on surfaces having different friction coefficients. Such an unfavorable handling will be due to the fact that the coupling of the two axles has the result that the distribution of the braking force to the wheels of the two axles differs from the prescribed distribution. It will be understood that such stability losses will mainly occur when the vehicle is braked strongly or suddenly from a high speed of travel.

SUMMARY OF THE INVENTION

For this reason it is an object of the invention to eliminate that disadvantage and so to improve a motor vehicle which is of the kind described first hereinbefore that a reliable handling of the vehicle during a braking of the vehicle from a high speed of travel can be ensured with relatively simple means.

That object is accomplished in accordance with the invention in that the electric control device comprises a switch, which is arranged to be automatically enabled in response to a rise of the speed of travel of the vehicle to a predetermined value and which in an enabled state is arranged to respond to a braking operation or a predetermined braking operation by a disabling of the drive train leading to the secondary drive axle and to maintain said drive train disabled, and an additional switch, which is manually operable to enable said drive train.

In a motor vehicle in accordance with the invention the drive train for driving the secondary driven axle will be disabled when the service brake has been applied and in that case only the primary axle will be driven and an unstable handling will be much less likely to occur.

It is desired to disable the secondary driven axle only to response to the brake application under a brake pressure which exceeds a predetermined value. This is accomplished in that the electric control device comprises a third switch, which is arranged to be closed in response to a depression of the brake pedal and/or in response to a rise of the brake pressure above a predetermined value and/or in response to a sudden rise of the brake pressure.

BRIEF DESCRIPTION OF THE DRAWING

The drawing is a diagrammatic representation of a motor vehicle in accordance with the invention in which the front axle constitutes a primary driven axle and the rear axle constitutes a secondary driven axle which is adapted to be enabled under the control of an electric control device.

DETAILED DESCRIPTION OF THE PREFERRED EMBODIMENT

A preferred embodiment of the invention will now be described with reference to the drawing.

A motor 1 drives the front axle 3 via a differential 2. The front wheels are represented in the drawing only by the associated brake disks 4. A drive train 5 leads to the rear axle 6 and incorporates a mechanical clutch 7. The rear wheels are also represented only by the associated brake disks 8. A brake pressure source 9 is connected by suitable lines to the front wheel brakes 10 and to the rear wheel brakes 11. A tachometer 12 is driven by the differential 2 of the front axle 3. The clutch 7 is operable by means of a vacuum-operable actuator 13, which consists of a diaphragm cell and is connected to a vacuum source 14.

When the vehicle is in the illustrated state the drive train 5 for driving the rear axle is disabled because the clutch 7 is released. When the rear axle 6 is to be driven, the clutch 7 can be engaged by an instantaneous depression of the pushbutton 15 so that the self-holding change-over relay 16 is energized to close the circuit of a solenoid valve 17. As a result, the solenoid valve 17 assumes a position in which the upper part of the vacuum-operated actuator 13 is connected to the vacuum source 14 and the lower part of the actuator 13 is vented so that the clutch 7 is engaged to establish a driving connection to the rear axle 6. As the relay 16 is self-holding, the circuit which has been described remains closed until the pushbutton 15 is operated again so that the relay 16 then interrupts the circuit of the solenoid valve 17.

In accordance with the invention the electric control device comprises three additional switches 18, 19 and 20. The switch 18 is closed in response to an operation of the brake pedal. The switch 19 is closed in response to an increase of the speed of travel to a predetermined critical value. The switch 20 is closed in response to a rise of the brake pressure to a predetermined critical value. The clutch 7 cannot be engaged unless the change-over relay 16 has previously closed the circuit of the solenoid valve 17. When the clutch 7 is engaged so that the rear axle 6 is driven and the critical speed of travel has been reached or exceeded and in that condition of the vehicle the brake pedal 21 is operated in such a manner that the critical brake pressure is exceeded, all three switches 18, 19 and 20 will be in a closed state and the change-over relay 16 will be energized independently of the actuation of the pushbutton 15 and will then interrupt the circuit of the solenoid valve 17. As a result, the solenoid valve 17 is actuated to assume the illustrated position so that the actuator 13 is operated to disengage the clutch 7.

Within the scope of the invention the switch 20 which is responsive to a high brake pressure may be omitted or the means for controlling the switch 20 may be designed to close that switch in response to a rise of the brake pressure gradient (dp/dt) above a predetermined value, i.e., in response to a so-called startle braking.

I claim:

1. A motor vehicle, comprising
   a primary driven axle,
   a secondary driven axle,
   braking means for applying a rising brake pressure for braking said axles, a drive train operatively connected to said secondary axle and comprising a clutch, a clutch controller operative to engage and disengage said clutch, clutch engaging means connected to said clutch controller for causing said clutch controller to engage said clutch, and clutch releasing means connected to said clutch controller for causing said clutch controller to release said clutch, and to maintain said clutch in released condition until said clutch engaging means are operated, said clutch-engaging means including first electromechanical switch means responsive to manual pressure for causing said clutch controller to engage said clutch, said clutch-releasing means including second electromechanical switch means responsive to vehicle speed, and third electromechanical switch means responsive to actuation of said braking means, said second and third electromechanical switch means causing said clutch controller to release said clutch and to maintain said clutch in released condition when said vehicle speed exceeds a predetermined value and when said brake means are actuated.

2. The motor vehicle of claim 1, wherein said second and third electromechanical switch means are connected in series.

3. The motor vehicle of claim 1, wherein said clutch-releasing means further comprises fourth electromechanical switch means responsive to a rise in brake pressure, said second, third, and fourth electromechanical switch means causing said clutch controller to release said clutch and to maintain said clutch in released condition when said vehicle speed exceeds a predetermined value, said brake means are actuated, and said brake pressure exceeds a predetermined pressure value.

4. The motor vehicle of claim 3 wherein said second, third, and fourth electromechanical switch means are connected in series.

5. The motor vehicle of claim 1, wherein said clutch-releasing means further comprises fourth electromechanical switch means responsive to a rise in gradient of the brake pressure, said second, third, and fourth electromechanical switch means causing said clutch controller to release said clutch and to maintain said clutch in released condition when said vehicle speed exceeds a predetermined value, said brake means are actuated, and said gradient of the brake pressure rises to a predetermined gradient value.

6. The motor vehicle of claim 5, wherein said second, third, and fourth electromechanical switch means are connected in series.

7. The motor vehicle of claim 1 further comprising electromechanical relay means connected in series with said clutch engaging means, said clutch releasing means, and said clutch controller, for causing said clutch controller to engage said clutch and to maintain said clutch in engaged condition when said first electromechanical switch means is closed by manual pressure, and for causing said clutch controller to release said clutch and to maintain said clutch in released condition when said second and third electromechanical switch means are closed by said vehicle speed exceeding said predetermined value and by actuation of said braking means.

8. A motor vehicle, comprising a primary driven axle, a secondary driven axle, braking means for applying a rising brake pressure for braking said axles, a drive train operatively connected to said secondary axle and comprising a clutch, a clutch controller operative to engage and disengage said clutch, a clutch engaging circuit connected to said clutch controller, said clutch engaging circuit including first actuable electromechanical switch means responsive to manual pressure and electromechanical relay means for causing said clutch controller to engage said clutch and to maintain said clutch is engaged condition when manual pressure is applied to said first electromechanical switch means, and a clutch releasing circuit connected to said electromechanical relay means, said clutch releasing circuit including second actuable electromechanical switch means responsive to vehicle speed, and third actuable electromechanical switch means responsive to actuation of said braking means, said second and third electromechanical switch means and said electromechanical relay means causing said clutch controller to release said clutch and to maintain said clutch in released condition when said vehicle speed exceeds a predetermined value and when said brake means are actuated.

9. The motor vehicle of claim 8, wherein said second and third electromechanical switch means are connected in series.

10. The motor vehicle of claim 8, wherein said clutch-releasing means further comprises fourth actuable electromechanical switch means responsive to a rise in brake pressure, said second, third, and fourth electromechanical switch means causing said clutch controller to release said clutch and to maintain said clutch in released condition when said vehicle speed exceeds a predetermined value, said brake means are actuated, and said brake pressure exceeds a predetermined pressure value.

11. The motor vehicle of claim 10 wherein said second, third, and fourth electromechanical switch means are connected in series.

12. The motor vehicle of claim 8, wherein aid clutch-releasing means further comprises fourth actuable electromechanical switch means responsive to a rise in gradient of the brake pressure, said second, third, and fourth electromechanical switch means causing said clutch controller to release said clutch and to maintain said clutch in released condition when said vehicle speed exceeds a predetermined value, said brake means are actuated, and said gradient of the brake pressure rises to a predetermined gradient value.

13. The motor vehicle of claim 12, wherein said second, third, and fourth electromechanical switch means are connected in series.

* * * * *